Patented Mar. 27, 1951

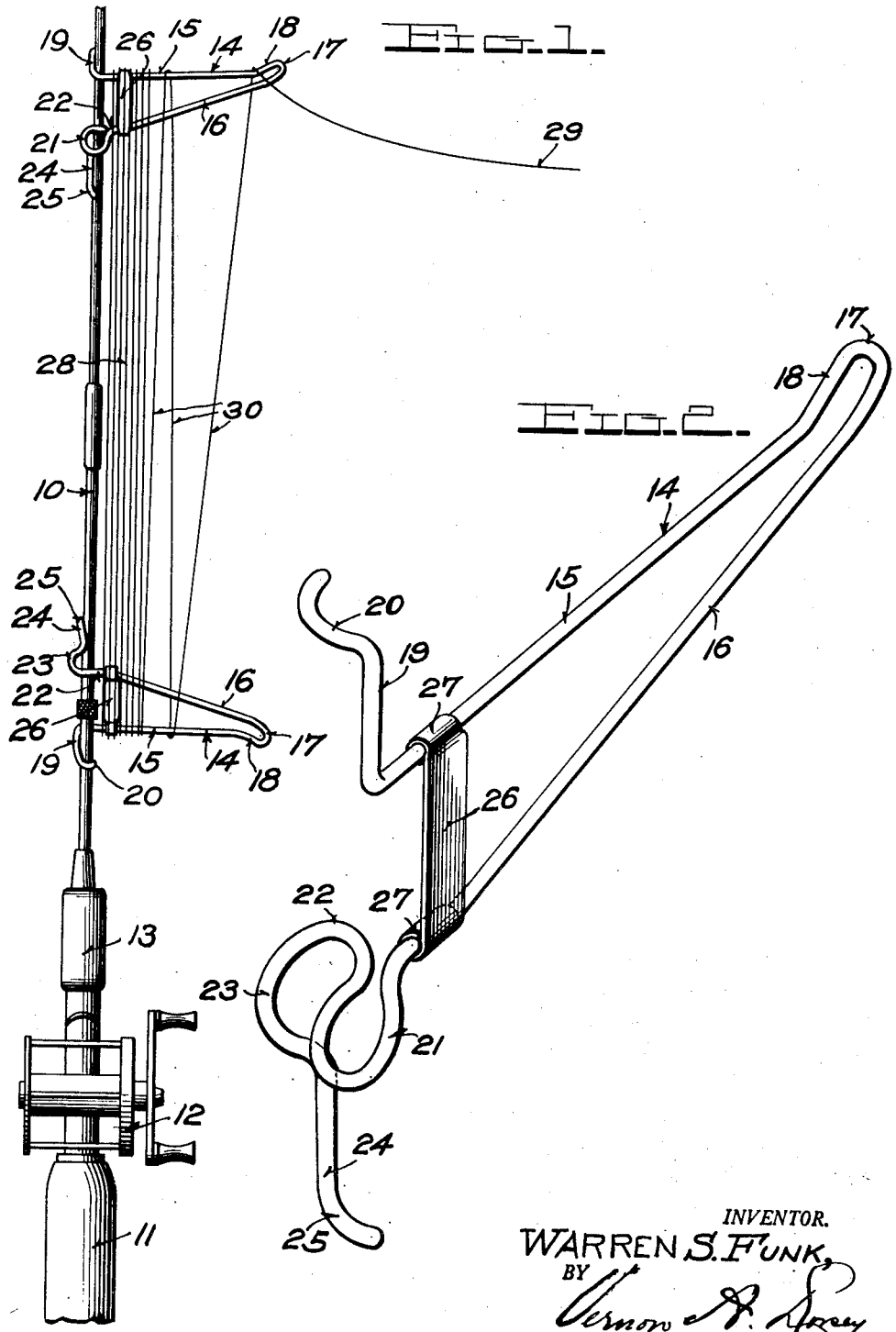

2,546,222

UNITED STATES PATENT OFFICE 2,546,222

FISHING LINE DRIER

Warren S. Funk, Sioux Falls, S. Dak.

Application December 30, 1948, Serial No. 68,170

1 Claim. (Cl. 43—25.2)

This invention relates to fishing line driers and more particularly to one of the character that, in use, is applied to a fishing rod for its support.

It is well known, among fishermen in particular, that a fishing line should be carefully dried each time after a day's use, and before it is put away, in order to prevent mildewing, early rotting and other serious deterioration of the line, making it unserviceable for further use.

An object of the present invention is to produce an improved device, simple in character yet highly efficient and effective in use, of moderate cost, and one which is easily and quickly attachable to and removable from a fishing rod.

Another object is to provide such device so that the fishing line as drawn from the reel on the rod is readily and conveniently carried around, over and under the device, loosely and in such manner that air is quite freely penetrable and circulatable between the folds or windings of the line as applied on the device for drying.

A further object is to provide for adjustment in the mounting and effective working range of the device on the fishing rod.

A still further object is to provide for the ready removal of the dried line from the drier of the present invention and the rewinding of the line on the reel which is provided on the rod.

Yet another object is to produce the device of the present invention in such manner and form that, when not in use, it is in small compass, and so compact as to be carried conveniently in an ordinary fishing tackle box or in the pocket.

Other objects and advantages to be attained will appear more fully and clearly in the following description.

A practical but non-limiting adaptation of the invention is illustrated in the accompanying drawings, wherein:

Figure 1 is a fragmentary view of a portion of a fishing rod, showing a drier device applied thereto in accordance with the invention; and Figure 2 is a perspective view, on an enlarged scale, of one of the bracket members or arms of the device detached and showing details of its structural form.

Referring now to the drawings in detail, the numeral 10 designates a portion of an ordinary fishing rod in the region of its handle 11. Attached to the handle 11 is a regular reel 12 on which the fishing line is wound and played out therefrom in use.

Ahead of the reel 12, the rod 10 has the usual forward hand grip element 13 indicated thereon. The rod 10, however, as far as the present invention is concerned, may be of any kind or type as generally adopted and used by fishermen.

Generally stated, the drier device of the present invention comprises a pair of opposed, spaced-apart, arms or bracket members which are detachably secured to the fishing rod and project substantially perpendicularly or right-angularly, laterally therefrom, so that the fishing line, as drawn from the reel on the rod, can be looped around and around, over and under, said arms or bracket members, easily and with ample looseness for the air to enter readily and freely between the loopings of the line as thus wound about the arms or bracket members.

In practice, said arms or bracket members are usually spaced approximately a minimum distance of, say for example, twelve inches (12") apart, and up to a maximum of twenty-eight inches (28"), depending upon the particular kind, gauge or weight, and length of the line to be dried; and, for this reason, the arms or bracket members are mounted on the rod adjustably toward and from each other as well as being detachable.

It is here noted that, obviously, the material of which the arms or bracket members are made is non-corrosive and rust-proof, usually a suitable metal or some characteristic plastic material.

More specifically with reference to the accompanying drawings, the device of the present invention as shown, is in the form of an open frame type of bracket structure or arm, designated as a whole by the numeral 14 and shown in clearer detail in Figure 2 of the drawings.

As shown, this element 14 is formed of a single piece of wire, either metallic or plastic, sufficiently stiff and normally form-retentive but somewhat inherently resilient and yieldable under applied force, with appreciably reactive spring effect when relieved of such force. For the purpose of the present invention the element 14 is made of a wire that is non-corrosive and rust-proof in itself or else the finished article when ready for use is treated or coated to make it resistant to corrosion and rust-creating conditions.

Instead of making a pair of the elements 14 in separate rights and lefts so as to be opposed in reverse relation to each other when mounted in use on the fishing rod 10 as indicated in Figure 1 of the drawings, said elements are all made alike and in one form. In this way, to obtain the reverse relation of the elements 14, as indicated in Figure 1, one element is placed on the rod 10, say the upper one as shown in the figure, and the other (the lower one) is turned over or inverted and placed in opposed working relation on the rod.

As shown more clearly in Figure 2, the element 14 includes one straight length 15 of the constituent wire, which is disposed outward relative to the opposed element of the pair when attached in use on the fishing rod 10. The wire is then rebent, inclinedly as at 16, and divergently, inward from the part 15, with a round bluntness 17 at the extreme end of the element where the parts 15 and 16 tend to meet convergently, and, for a slight distance inwardly from the rounded outer end 17 of the element, the part 15 is turned with an inclined shoulder-like formation 18 which is at an angle substantially parallel with the angle of the divergent part 16.

The part 15 has a substantially right-angular extension 19 at its inner end, and at the outer end of said extension 19 is a curved, rebent, angular portion 20 which is provided as a bearing for the seating engagement of the fishing rod 10 therewith, as will be later more fully described.

The inner end portion of the divergent part 16 of said element 14 is looped roundingly, as at 21, to provide some spring effect for a rebent and curved, re-entrantly looped bearing portion 22 for seating engagement of the fishing rod as will be also later explained in connection with aforesaid bearing portion 20.

From the bearing portion 22 the wire is again looped roundingly, as at 23, to provide further spring effect for said bearing 22 similar to that of the part 21. Then the wire is extended straightwise, as at 24, substantially in longitudinal alinement with the part 19 at the inner end of part 15, said parts 19 and 24 to lie lengthwise of the fishing rod when the element 14 is attached thereto.

At the outer end of said straight extension 24 of the part 16 is a curved angular bearing portion 25 serving as a rod-engaging seat in cooperation with the aforesaid bearing portions 20 and 22, as will be presently described with reference to the mounting of the element 14 on the fishing rod.

The divergent inner end portions of the parts 15 and 16 of the bracket element 14 are cross-braced by a sheet metal, strap-like, strut member 26 which is curled or rolled securely at its opposite ends around the parts 15 and 16, as at 27. This bracing provision 26 gives ample rigidity to the major body portion of the bracket element 14, yet the free end portions 20 and 25 of the parts 15 and 16, respectively, are readily sprung into engagement over the same side of the fishing rod 10 opposite to the side where the middle bearing 22 is engaged when the element 14 is attached for use on the rod as indicated in Figure 1 of the drawings.

By the relative provision of the middle or intermediate bearing portion 22 and the cooperative end bearing portions 20 and 25, the spring effect thereof gives a secure yet releasable attachment of the bracket element 14 to the fishing rod 10, with permission of adjustment longitudinally at any desired place in the length of the rod. That is to say, the parts 20, 22 and 25 are given a normal relatively positioned set so that they have to be sprung considerably while the element 14 is attached to and removed from the rod 10. In other words, the rod is, for example, first seated in the middle bearing 22 and then the element 14 is rocked, to bring the bearing 25 against the opposite side of the rod, whereupon, by further manipulation of said element, the parts 22 and 25 are sprung to such extent that the bearing 20 is then readily sprung into engagement over the same side of the rod which is engaged by the bearing 25.

With the arms or bracket elements 14 of the present invention attached to the fishing rod in the spaced-apart and opposed paired relation as indicated in Figure 1 of the drawings, the wet line is wound, by hand, around and around, over and under said elements 14, as at 28, starting the winding 28 with the outer or sinker or bait end of the line and then gradually wrapping the rest of the line loosely about said elements until the entire line is drawn off the reel 12. This winding of the wet line is obviously easily accomplished by hand, as at least the fingers of one hand are free for manipulation in spreading apart the respective loopings of the line and laying them with ample looseness for ideal air-drying effect on said arms or bracket elements 14; and, even though the other hand is necessarily used to do the winding, the fingers thereof may be also used to some extent to assist in the loosening of the windings of the line on the supporting arms or members 14.

There is a particular advantage in the use of the device of the present invention, in that the operator can easily see what he is doing and the arrangement of the elements 14 on the rod 10 is such that the winding and laying of the loops of the line by hand is greatly facilitated.

In addition to the ease in which the fishing line is wound as at 28 on the arms or elements 14, as just above pointed out, the device as used assures reasonably quick and thorough drying of the line. Moreover, removal of the dried line from the device of the present invention and rewinding of the line on the reel 12 is easily accomplished and with little, if any, liability of tangling the lines. Rewinding the dried line 19 back on the reel 12 is accomplished very easily and quickly in several ways, namely, by looping that portion of the fishing line 19 between the tip guide of the fishing rod 10 and elements 14 around any object which will allow the line 19 to run freely, then by holding the rod 10 in a position a few feet away from the supporting object with the elements 14 pointing toward the supporting object. The line 19 will uncoil freely, without any manipulating or guidance, from the elements 14 and follow around the supporting object, through the tip guide of the fishing rod 10 and other guides on the rod 10 as the reel 12 is operated. Or, that portion of the rod 10 to which the elements 14 are attached may be detached from the handle 11 and placed on the ground, or, the male end of the rod 10 stuck into the ground, or, the rod 10 supported in any manner which will allow some freedom of the elements 14 to adjust themselves to permit free uncoiling of the line 19. The dried line 19 may then be rewound on the reel 12 by the operator standing a few feet away from the rod 10 with the elements 14 pointing in the direction of the operator.

There is a further advantage in the device of the present invention in that, while it is easily attached to and removed from the fishing rod and is highly efficient in the use for which it is intended, the two arms or bracket elements 14, when not in use, can be placed flatwise together so as to be carried conveniently in any ordinary or conventional fishing tackle box or container, or in the pocket, and thus be readily at hand for the prompt drying of the fishing line after each time of use is over.

It is here further noted that while the illustrated and herein described open frame-like form of the arm or bracket element 14 is practical and ideal for the purpose intended, the invention is not limited specifically to such structure, as modification and change therein is possible and even contemplated within the spirit and scope of the appended claim. This also applies to the means for effecting the attachment of the element 14 to the fishing rod.

What is claimed is:

A fishing line drier, comprising spaced-apart opposed arms mountable detachably at their inner ends on a fishing rod for support, the wet line to be wound on said arms for its drying, each arm consisting of an open frame-like structure formed of a single piece of wire and having a straight portion constituting the line receiving part proper of the arm, and a rebent continuation from the straight portion formed straight as a companion portion but slanted divergently laterally relative to said line receiving portion, the convergent ends of said two straight portions being rounded bluntly at the apex, and the apex end of said line receiving portion of the arm being bent laterally and substantially parallel with said companion portion, the free end portion of said companion portion being formed into an intermediate open loop portion and the portion beyond said loop being extended at substantially right-angles to said line receiving portion and away therefrom, the line receiving portion having its free end portion extended at right-angles thereto, away from said companion portion, and in substantial alignment with said extended portion of said companion portion, said extended portions being formed with oppositely extended curved bearing portions.

WARREN S. FUNK.

REFERENCES CITED

The following references are of record in the file of this patent:

UNITED STATES PATENTS

| Number | Name | Date |
| --- | --- | --- |
| 266,704 | Lufkin | Oct. 31, 1882 |
| 948,672 | Muller | Feb. 8, 1910 |
| 1,082,448 | Scharer | Dec. 23, 1913 |
| 1,552,481 | Gyurcsik | Sept. 8, 1925 |

FOREIGN PATENTS

| Number | Country | Date |
| --- | --- | --- |
| 77,882 | Sweden | July 25, 1933 |